United States Patent Office 3,130,210
Patented Apr. 21, 1964

1

3,130,210
ESTRADIOL DERIVATIVES
Oskar P. Wintersteiner, New Brunswick, and Mildred L. Moore, Highland Park, N.J., assignors to Olin Mathieson Chemical Corporation, New York, N.Y., a corporation of Virginia
No Drawing. Filed Nov. 14, 1962, Ser. No. 237,741
14 Claims. (Cl. 260—397.4)

This invention relates to and has as its objects, the provision of new physiologically active steroids, methods for preparing the same, and new intermediates useful in said preparation.

The final products of this invention can be represented by the formula

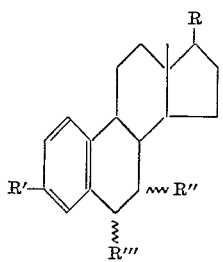

wherein R is acyloxy, R' is hydroxy or acyloxy, R" may be hydrogen, halogen (chloro, bromo, iodo or fluoro), hydroxy or acyloxy and R''' may be hydrogen, hydroxy, lower alkoxy or acyloxy. In a preferable embodiment of this invention, R and R' are acyloxy, R" is hydroxy, acyloxy or halogen, and R''' is lower alkoxy or acyloxy. In the most preferable embodiment of this invention, R, R', R" and R''' are acyloxy. (Whenever in this application and the claims appended hereto a curved line [∼] is employed in the linkage of atoms in a formula, it is meant to denote that the connected atom may be either in the alpha or beta position, as may be determined in the respective compounds.)

The preferred acyloxy radicals are those of hydrocarbon carboxylic acids of less than twelve carbon atoms, as exemplified by the lower alkanoic acid (e.g., acetic, propionic, butyric and tert.-pentanoic acids), the lower alkenoic acids, the monocyclic aryl carboxylic acids (e.g., benzoic and toluic acids), the monocyclic aryl lower alkanoic acids (e.g., phenacetic and β-phenyl propionic acids), the cyclic alkane carboxylic acids and the cycloalkene carboxylic acids.

The compounds of this invention are physiologically active steroids which possess anti-gonadotrophic activity, i.e., they inhibit gonadotrophic hormone secretion by suppressing the gonadotrophic function of the hypophysis, and they can be used in the treatment of such conditions as hypo-gonadotrophic acne. The compounds may be formulated for such administration, the concentration and/or dosage being based on the activity of the particular compound and the requirements of the patient.

The final products of this invention are prepared by the processes of this invention which entail a number of steps beginning with certain materials as initial reactants. These initial reactants are compounds which are known to the art and include, for example, 6-keto-estra-3,17β-diol diacetate and 6-dehydroestra-3,17β-diol diacetate. The steps of the processes are shown by the following equations, wherein R' R" and R''' are the same or different and represent hydrogen, hydroxy, methoxy and acyloxy and Z represents halogen.

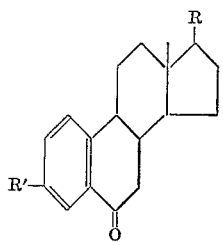

Ia R=R'=CH₃COO

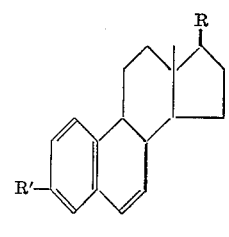

IIa R=R'=CH₃COO

↓ ↓

IIIa R=R'=CH₃COO;
Z=halide (Cl,Br,I,F)

⇌

IVa R=R'=CH₃COO;
R'''=βOH;
Z=α-halide (Cl,Br,I,F)
IVb R=R'=CH₃COO;
R'''=αOH;
Z=α-halide
IVc R=R'=CH₃COO;
R'''=βCH₃COO;
Z=α-halide
IVd R=R'=CH₃COO;
R'''=αCH₃COO;
Z=α-halide

↓

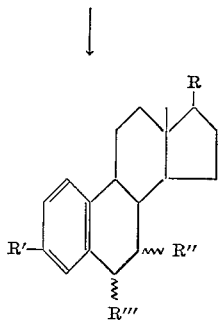

Va R=R'=CH₃COO

VIa R=R'=CH₃COO;
R'''=βOH;
R''=H
VIb R=R'=CH₃COO;
R'''=αOH;
R''=H
VIc R=R'=CH₃COO;
R''=βCH₃COO;
R'''=αCH₃COO
VId R=CH₃COO;
R'=OH;
R'''=αOH;
R''=βOH
VIe R=R'=OH;
R'''=H;
R''=βOH
VIf R=R'=CH₃COO;
R'''=αCH₃O;
R''=βOH
VIg R=R'=CH₃COO;
R'''=βCH₃O;
R''=αOH
VIh R=R'=CH₃COO;
R'''=βCH₃COO;
R''=αCH₃COO
VIi R=R'=CH₃COO;
R'''=βOH;
R''=αOH
VIj R=R'=R''=CH₃COO;
R'''=H

In the first step of the process of this invention, the initial reactant, 6-dehydroestradiol diacetate (Compound IIa) is oxidized, as by treatment with peroxide, dioxane and perchloric acid, and is simultaneously halogenated, as by reaction with a haloacetamide, for example, N-bromoacetamide, to yield 6β-hydroxy-7α-haloestradiol diacetate (Compound IVa), which is a new compound of this invention.

Alternatively, 6-ketoestradiol diacetate (Compound Ia) may first be halogenated as by treatment with a halogen and/or a hydrohalic acid, for example, hydrobromic acid, to produce 6-keto-7α-haloestradiol (Compound IIIa) which is a new compound of this invention. 6-keto-7α-haloestradiol (Compound IIIa) is then reduced, as by reaction with sodium borohydride or lithium boro-hydride, to yield 6α-hydroxy-7α-haloestradiol diacetate (Compound IVb), which is also a new product of this invention. In order to obtain the 3,6,17-triacetyl-7α-halo-estradiol derivatives (Compounds IVc and IVd) of the corresponding 6-hydroxy products (Compounds IVa and IVb), the 6-hydroxy compounds are acetylated as by treatment with an acylating agent, such as acyl chloride or acid anhydride, in the presence of a base, for example, pyridine, to yield the corresponding 3,6,17-triacetyl derivatives (Compounds IVc and IVd) which are also new compounds of this invention.

To obtain the 6β,7β-oxidoestradiol diacetate (Compound Va) the 6β-hydroxy-7α-haloestradiol diacetate Compound IVa is treated with potassium tert.-butoxide. The 6β,7β-oxidoestradiol diacetate is also a new product.

The 6β,7β-oxidoestradiol diacetate (Compound Va) is then hydrolyzed with perchloric acid and the resulting 6,7-glyol treated with an acetylating agent in a basic medium, such as pyridine, to yield the 3,6α,7β,17-tetraacetate of the tetrol (Compound VIc), which is also a new product of the instant invention. Alternatively, this compound (VIc) can be obtained from the bromhydrin IVa (Z=Br) by treating the latter with aqueous potassium carbonate, and acetylating the resulting 6α,7β-dihydroxy estradiol 17-monoacetate (VId) (formed via the oxide Va) with an acetylating agent such as acetic anhydride in the presence of an acid catalyst such as p-toluene sulfonic acid. The stereoisomeric 3,6β,7α,17-tetrol tetraacetate (VIh) may be obtained by treating 6α,7α-oxidoestradiol diacetate with perchloric acid in acetone and acylating the 6β,7α-dihydroxyestradiol diacetate (Compound VIi) obtained, by treatment with an acylating agent in a basic medium. Compound VIh is also a new product of this invention.

To obtain the 6-alkoxy derivatives (Compounds VIf and VIg), the two stereoisomeric 6,7-oxido estradiols diacetates (Compound Va) and its 6α,7α-stereoisomer are treated with perchloric acid and an alcohol, such as methanol or ethanol. The 6-alkoxy-7-hydroxyestradiols are also new products of this invention.

The following examples are illustrative of the invention (all temperatures being in centigrade):

EXAMPLE 1

6β-Hydroxy Estradiol Diacetate (VIa)

409.6 mg. of 6-ketoestradiol diacetate (Ia) is dissolved in 20 ml. ethyl acetate, added to 250 mg. of prereduced platinum dioxide in 23 ml. ethyl acetate, and shaken with hydrogen at atmospheric pressure. When the uptake of hydrogen ceases, the catalyst is removed by filtration and the solution is evaporated to dryness in vacuo. The residue (420.7 mg.) crystallizes as plates from ethyl acetate-hexane, yielding 341.1 mg. of 6β-hydroxy estradiol diacetate (VIa) which melts at 161–162° (corr.);

$\lambda_{sh.}^{EtOH}$ 215 mμ ($\epsilon$=9700), $\lambda_{max.}^{EtOH}$ 267 mμ ($\epsilon$=502), 275 mμ ($\epsilon$=450); [α]$_D$ +4.7° (chlf.)

*Analysis.*—Calcd. for $C_{22}H_{28}O_5$: C, 70.94; H, 7.58. Found: C, 70.58; H, 7.87.

EXAMPLE 2

6α-Hydroxy Estradiol Diacetate (VIb)

1.0029 g. of 6-ketoestradiol diacetate is dissolved in 400 ml. reagent methanol, magnetically stirred and cooled to 0° C. 1 g. of sodium borohydride is dissolved in 100 ml. reagent methanol, cooled to 0° C., then added dropwise under anhydrous conditions to the solution of the ketone. After 15 minutes, the reaction mixture is acidified to about pH 5 with cold 10% acetic acid and diluted with 1.5 l. $H_2O$. The mixture is extracted with three 750 ml. portions of ether. The combined ether extracts are washed with sodium bicarbonate and twice with $H_2O$, and then dried over sodium sulfate. The residue, after the removal of the solvent in vacuo is 1.0389 g.

Chromatography of the residue on acid washed alumina yields about 481.5 mg. of slightly impure 6α-hydroxy-estradiol diacetate (VIb) in the ether-benzene 1:3 eluates. Two crystallizations from ethyl acetate-hexane give 334.3 mg. of the pure compound (VIb) which melts at 128–129.5° C. (corr.);

$\lambda_{sh.}^{EtOH}$ 263 mμ ($\epsilon$=658), $\lambda_{max.}^{EtOH}$ 267 mμ ($\epsilon$=760), 275 mμ ($\epsilon$=644); [α]$_D$ +64° (chlf.)

*Analysis.*—Calcd. for $C_{22}H_{28}O_5$: C, 70.94; H, 7.58. Found: C, 70.97; H, 7.59.

EXAMPLE 3

6β-Hydroxy-7α-Bromoestradiol Diacetate (IVa)

To a solution of 101.4 mg. of 6-dehydroestradiol diacetate (IIa) in 5 ml. of pure peroxide-free dioxane and 0.63 ml. of 0.5 N perchloric acid is added in the dark at room temperature with stirring over a period of two minutes 50 mg. of solid N-bromacetamide. After forty minutes 0.24 ml. of 5% sodium sulfite is added with stirring until potassium iodide-starch paper is no longer blued. Water is added and the turbid mixture is extracted with 50 ml. of chloroform. The residue from the washed and dried chloroform solution weighs 163.8 mg. and crystallizes as rods from 90% methanol yielding 80.2 mg. of 6β-hydroxy-7α-bromoestradiol diacetate (IVa), which has the following properties: M.P. 186–187° C. (corr.), [α]$_D$ +10° (chlf.);

$\lambda_{max.}^{EtOH}$ 268 mμ ($\epsilon$=585), 276 mμ ($\epsilon$=572)

*Analysis.*—Calcd. for $C_{22}H_{27}O_5Br$: C, 58.55; H, 6.03; Br, 17.71. Found: C, 58.44; H, 5.88; Br, 18.19.

EXAMPLE 4

6-Keto-7α-Bromoestradiol Diacetate (IIIa)

A stirred solution of 45.2 mg. 6β-hydroxy-7α-bromoestradiol diacetate (IVa) in 6 ml. of reagent acetone is treated dropwise with a 1 ml. solution of 0.402 N chromic acid in sulfuric acid and acetone. (A solution of 20 g. of chromium trioxide in 17.4 ml. of concentrated sulfuric acid and 50 ml. of distilled water is made up to 100 ml. with water. 0.67 ml. of this reagent is diluted to 10 ml. with reagent acetone.) After ten minutes, the excess chromium trioxide is destroyed with 95% ethanol and the reaction mixture is diluted with water. The acetone and ethanol are removed in vacuo and the resulting precipitate is filtered and washed well with water. Two methanol crystallizations of the precipitate yields 27 mg. of 6-keto-7α-bromoestradiol diacetate (IIIa) of M.P. 172–173.5° C. (corr.);

$\lambda_{max.}^{EtOH}$ 212 mμ ($\epsilon$=20,500), 258 mμ ($\epsilon$=10,790), 307 mμ ($\epsilon$=2,283); [α]$_D$ −15° (chlf.)

*Analysis.*—Calcd. for $C_{22}H_{25}O_5Br$: C, 58.80; H, 5.61. Found: C, 59.06; H, 5.90.

EXAMPLE 5

6-Keto-7α-Bromoestradiol Diacetate (IIIa)

248 mg. of 6-ketoestradiol diacetate is dissolved in 15 ml. of glacial acetic acid and 2 drops of 0.65 M bromine in acetic acid is added. Yellow color fades out on the addition of 1 drop of 32% hydrobromic acid. A total of 1.08 ml. (5% excess) bromine solution is added dropwise. The reaction mixture is diluted with water and extracted twice with chloroform. The chloroform is then washed with water, sodium bicarbonate and finally water. The residue from the sodium sulfate dried chloroform after three crystallizations from methanol yields 6-keto-7α-bromoestradiol diacetate (IIIa) which melts at 171–172° C. (corr.);

$\lambda_{max.}^{EtOH}$ 257 m$\mu$ ($\epsilon$=11,190), 305 m$\mu$ ($\epsilon$=2338); [$\alpha$]$_D$ −16° (chlf.)

*Analysis.*—Calcd. for $C_{22}H_{25}O_5Br$: C, 58.80; H, 5.61. Found: C, 58.70; H, 5.73.

EXAMPLE 6

*6α-Hydroxy-7α-Bromoestradiol Diacetate (IVb)*

32.3 mg. of 6-keto-7α-bromoestradiol diacetate is dissolved in 15 ml. of methanol and cooled to 0° C. This solution is treated dropwise under anhydrous conditions with a 0° solution of 32.7 mg. of sodium borohydride in 6 ml. of methanol. After 15 minutes, the reaction mixture is acidified to about pH 5 with about 5 ml. of 10% acetic acid and is diluted with 60 ml. of cold water. Extraction with ether, which is then washed with sodium bicarbonate solution and water and finally dried over sodium sulfate yields 32.1 mg. of crude 6α-hydroxy-7α-bromoestradiol diacetate (IVb). This residue is then crystalized twice from ethyl acetate-hexane yielding 19.2 mg. of 6α-hydroxy-7α-bromoestradiol diacetate (IVb), which melts at 169–171.5° C. (corr.);

$\lambda_{max.}^{EtOH}$ 267 m$\mu$ ($\epsilon$=607), 275 m$\mu$ ($\epsilon$=566); [$\alpha$]$_D$ +29° (chlf.)

*Analysis.*—Calcd. for $C_{22}H_{27}O_5Br$: C, 58.55; H, 6.03. Found: C, 58.62; H, 5.92.

EXAMPLE 7

*6β-Hydroxy-7α-Bromoestradiol Triacetate*

51.7 mg. of 6β-hydroxy-7α-bromoestradiol diacetate (IVa) is dissolved in 0.35 ml. anhydrous pyridine and 0.7 ml. acetic anhydride, and the mixture is allowed to stand at room temperature over-night. The excess acetic anhydride is decomposed by the addition of cold water. The precipitate formed is collected and washed well with water. Then it is twice crystallized from dilute methanol yielding 42.4 mg. of 6β-hydroxy-7α-bromoestradiol triacetate (IVc).

Similarly, by substituting other acid anhydrides or acyl halides for the acetic anhydride of Example 7, the corresponding 6 esters are formed. Thus, butyric anhydride and benzoyl chloride will yield the corresponding butyryl and benzoyl esters of 6β-hydroxy-7α-bromoestradiol 3,17-diacetate.

EXAMPLE 8

*6α-Hydroxy-7α-Bromoestradiol Triacetate (IVd)*

Following the procedure set forth in Example 7 but substituting 6α-hydroxy-7α-bromoestradiol diacetate (VIb) for 6β-hydroxy-7α-bromoestradiol diacetate (IVa) yields 6α-hydroxy-7α-bromoestradiol triacetate (IVd).

EXAMPLE 9

*6α-Hydroxy-Estradiol Diacetate (VIb)*

34.0 mg. of 6β-hydroxy-7α-bromoestradiol diacetate (IVa) is dissolved in 2 ml. of 90% ethanol and added to a suspension of 35 mg. of hydrogenated 5% palladium on calcium carbonate in 1 ml. of 90% ethanol. The hydrogen uptake ceases after 3 hours when the equivalent of one mole has been consumed. The catalyst is filtered off and the ethanol is removed in vacuo. The residue is dissolved in chloroform, washed twice with water, and dried over sodium sulfate. After the removal of the solvent in vacuo, 28 mg. of residue is chromatographed on a thin layer of neutral alumina. Development with chloroformethyl acetate, 24:1 and elution of the bands with ethyl acetate yields 17.8 mg. of impure 6α-hydroxy estradiol diacetate (VIb) which after two crystallizations from ethyl acetate-hexane yields pure 6α-hydroxy-estradiol diacetate (VIb), which melts at 128–130° C. (corr.);

$\lambda_{sh.}^{EtOH}$ 261 m$\mu$ ($\epsilon$=562); $\lambda_{max.}^{EtOH}$ 268 m$\mu$ ($\epsilon$=705); 276 m$\mu$ ($\epsilon$=660); [$\alpha$]$_D$ +60° (chlf.)

*Analysis.*—Calcd. for $C_{22}H_{28}O_5$: C, 70.94; H, 7.58. Found: C, 71.16; H, 7.73.

EXAMPLE 10

*6β,7β-Oxidoestradiol Diacetate (Va)*

285 mg. of 6β-hydroxy-7α-bromoestradiol diacetate (IVa) is dissolved in 7 ml. of dry t-butanol and is treated at room temperature with 1.93 ml. of freshly prepared 0.49 K-t-butoxide in t-butanol. After 30 minutes 250 ml. of ether is added and the mixture is washed twice with water and then dried over sodium sulfate. The residue weighing 238.9 mg. is crystallized from methanol, yields a mixture of the monoacetate and diacetate of the oxide (Va).

The acetates are separated by chromatography on a thin layer of neutral alumina. A portion of the mixture is put on a plate and developed with chloroform-ethyl acetate, 4:1. The U.V. absorbing bands are eluted with ethyl acetate-methanol, 9:1. The 6β,7β-oxidoestradiol diacetate (Va) is crystallized from dilute methanol and yields 75.8 mg. of pure 6β,7β-oxidoestradiol diacetate (Va); M.P. 124–125.5° C. (corr.);

$\lambda_{sh.}^{EtOH}$ 215 m$\mu$ ($\epsilon$=6,510), $\lambda_{max.}^{EtOH}$ 272 m$\mu$ ($\epsilon$=736), 278 m$\mu$ ($\epsilon$=791); $\lambda_{sh.}^{EtOH}$ 287 m$\mu$ ($\epsilon$=354); [$\alpha$]$_D$ −61° (chlf.)

*Analysis.*—Calcd. for $C_{22}H_{26}O_5$: C, 71.33; H, 7.08. Found: C, 71.23; H, 6.91.

EXAMPLE 11

*6α,7β-Dihydroxyestradiol Tetraacetate (VIc)*

21.1 mg. of 6β,7β-oxidoestradiol diacetate is dissolved in 5 ml. of 50% ethanol. A drop of 70% perchloric acid is added and the mixture is heated under reflux for 15 minutes. It is then diluted with water and extracted with ethyl acetate. The ethyl acetate is washed with dilute sodium bicarbonate and water and is dried over anhydrous sodium sulfate. The amorphous residue after the removal of the ethyl acetate in vacuo is dissolved in 0.1 ml. of anhydrous pyridine and 0.2 ml. of acetic anhydride and is heated for one hour in a water bath at 90° C. The acetic anhydride is decomposed with water. An ethyl acetate extract of the mixture, after being washed with dilute sodium bicarbonate, water, dilute hydrochloric acid and water, and dried over sodium sulfate, is twice crystallized from ethyl acetate-hexane yielding 10.5 mg. of 6α,7β-dihydroxyestradiol tetraacetate (VIc), melting at 214.5–216.5° (corr.);

$\lambda_{sh.}^{EtOH}$ 215 m$\mu$ ($\epsilon$=10,360); $\lambda_{max.}^{EtOH}$ 267 m$\mu$ ($\epsilon$=795), 274 m$\mu$ ($\epsilon$=743); [$\alpha$]$_D$ −1° (chlf.)

*Analysis.*—Calcd. for $C_{26}H_{32}O_8$: C, 66.08; H, 6.83. Found: C, 65.76; H, 6.78.

EXAMPLE 12

*6α,7β-Dihydroxyestradiol-17-Monoacetate (VId)*

44.9 mg. of 6β-hydroxy-7α-bromoestradiol diacetate in 2 ml. of methanol is flushed with nitrogen and then is treated with 0.2 ml. of 10% aqueous potassium carbonate which had previously been flushed with nitrogen. After one hour glacial acetic acid is added and the mixture is diluted with water. The 6α,7β-dihydroxyestradiol-17-monoacetate (VId), weighing 33.4 mg. obtained by evaporation in vacuo of a washed and dried ether extract is non-crystallizable;

$\lambda_{max.}^{EtOH}$ 282 m$\mu$ ($\epsilon$=2,150); [$\alpha$]$_D$ +30° (chlf.)

*Analysis.*—Calcd. for $C_{20}H_{26}O_5$: C, 69.34; H, 7.57. Found: C, 69.36; H, 7.58.

EXAMPLE 13

6α,7β-Dihydroxyestradiol Tetraacetate (VIc)

A mixture of 63.6 mg. of 6α,7β-dihydroxyestradiol 17-monoacetate and 96.4 mg. of p-toluene sulfonic acid.$H_2O$ in 3.6 ml. of acetic acid and 1.25 ml. of acetic anhydride is allowed to stand at room temperature overnight. The reaction mixture is poured into crushed ice and dilute sodium carbonate and is extracted with ether. The residue from the washed and dried ether, weighing 78.2 mg., is twice crystallized from ethyl acetate-hexane yielding 6α,7β-dihydroxyestradiol tetraacetate (VIc), melting at 215.5–216.5° C.;

$\lambda_{max.}^{EtOH}$ 260mμ (ε=595); 267 mμ (ε=780), 276 mμ (ε=723); [α]$_D$ −2° (dioxane)

Analysis.—Calcd. for $C_{26}H_{32}O_8$: C, 66.08; H, 6.83. Found: C, 65.76; H, 6.78.

EXAMPLE 14

7β-Hydroxyestradiol (VIe)

A solution of 100.4 mg. of 6β,7β-oxidoestradiol diacetate (Va) in 6 ml. of dry tetrahydrofuran is added slowly to a saturated solution of lithium aluminum hydride in 2 ml. of ether and 20 ml. of tetrahydrofuran and then heated under reflux for 6 hours. The excess lithium aluminum hydride is destroyed by adding ethyl acetate dropwise and the reaction mixture is distributed between 100 ml. of ethyl acetate and 100 ml. of water. 2 N hydrochloric acid is added, until the flocculent precipitate in the water is dissolved, before the layers are separated. The residue from the washed and dried ethyl acetate weighing 74.5 mg. crystallizes from methanol (a minimum amount) and ethyl acetate yielding 44.2 mg. of 7β-hydroxyestradiol (VIe) melting at 237–238° C. (corr.);

$\lambda_{sh.}^{EtOH}$ 220 mμ (ε=6,200); $\lambda_{max.}^{EtOH}$ 281 mμ (ε=2,045); [α]$_D$ +38° (EtOH)

Analysis.—Calcd. for $C_{18}H_{24}O_3$: C, 74.97; H, 8.39. Found: C, 74.92; H, 8.49.

EXAMPLE 15

6α-Methoxy-7β-Hydroxy Estradiol Diacetate (VIf)

42.8 mg. of 6β,7β-oxidoestradiol diacetate is dissolved in 15 ml. of reagent methanol containing 0.053 ml. of 70% perchloric acid. After the optical rotation of the solution is read ([α]$_D$ −14°), a saturated solution of sodium bicarbonate is added to neutralize. The methanol is removed in vacuo and the residue from the washed and dried chloroform extract weighing 42.3 mg. is twice crystallized from ethyl acetate-hexane yielding 6α-methoxy-7β-hydroxy estradiol diacetate (VIf), melting at 176.5–177.5° C. (corr.);

$\lambda_{sh.}^{EtOH}$ 213 mμ (ε=10,010), 219 mμ (ε=8,600); $\lambda_{max.}^{EtOH}$ 267 mμ (ε=563), 273 mμ (ε=527); [α]$_D$ −18° (dioxane)

Analysis.—Calcd. for $C_{23}H_{30}O_6$: C, 68.63; H, 7.51; $OCH_3$, 7.71. Found: C, 68.82; H, 7.79; $OCH_3$, 7.35.

Similarly, substituting ethanol or propanol for the reagent methanol of Example 15, the 6α-ethoxy-7β-hydroxy estradiol diacetate and 6α-propoxy-7β-hydroxy-estradiol diacetate is obtained.

EXAMPLE 16

6β-Methoxy-7α-Hydroxy Estradiol-3,17-Diacetate (VIg)

32.2 mg. of 6α,7α-oxidoestradiol diacetate is dissolved in 10 ml. of reagent methanol containing 0.04 ml. of 70% perchloric acid. After the optical rotation of the solution is determined ([α] +36°), a saturated solution of sodium bicarbonate is added to neutralize the reaction mixture. The methanol is removed in vacuo and the residue from the washed and dried chloroform crystallizes on standing in dilute methanol as 6β-methoxy-7α-hydroxy estradiol-3,17-diacetate (VIg) melting at 79–86° C. (corr.);

$\lambda_{max.}^{EtOH}$ 267 mμ (ε=580); [α]$_D$ +25° (dioxane)

Analysis.—Calcd. for $C_{23}H_{30}O_6$: —$OCH_3$, 7.71. Found: —$OCH_3$, 7.79.

EXAMPLE 17

6β,7α-Dihydroxyestradiol Diacetate (VIi)

29.8 mg. of 6α,7α-oxidoestradiol diacetate is dissolved in 20 ml. of 50% acetone containing a drop of 70% perchloric acid and is heated under reflux for 15 minutes. The residue obtained by evaporation in vacuo of a washed and dried ethyl acetate extract of the diluted reaction mixture is twice crystallized from ethyl acetate-hexane yielding 16.7 mg. of title (VIi) melting at 170–171° C. (corr.);

$\lambda_{max.}^{EtOH}$ 215 mμ (ε=9,430); $\lambda_{max.}^{EtOH}$ 267 mμ (ε=571), 275 mμ (ε=551); [α]$_D$ +16° (dioxane)

Analysis.—Calcd. for $C_{22}H_{28}O_6$: C, 68.02; H, 7.27. Found: C, 68.02; H, 7.26.

EXAMPLE 18

6β,7α-Dihydroxyestradiol-Tetraacetate (VIh)

8.5 mg. of 6β,7α-dihydroxyestradiol diacetate is acetylated in 0.2 ml. of anhydrous pyridine and 0.2 ml. acetic anhydride at room temperature overnight. After the decomposition of the acetic anhydride with water, the mixture is extracted with ether which is then washed with sodium bicarbonate, water, dilute hydrochloric acid and water, and dried over sodium sulfate. The residue, weighing 7.2 mg., after evaporation of the ether from dilute ethanol crystallizes and yields 3.8 mg. of 6β,7α-dihydroxyestradiol-tetraacetate (VIh); M.P. 134–136° C. (corr.);

$\lambda_{sh.}^{EtOH}$ 214 mμ (ε=12,330); $\lambda_{max.}^{EtOH}$ 269 mμ (ε=737), 276 mμ (ε=690); [α]$_D$ +68° (chlf.)

Analysis.—Calcd. for $C_{26}H_{32}O_8$: C, 66.08; H, 6.83. Found: C, 66.29; H, 6.72.

EXAMPLE 19

7β-Hydroxy Estradiol Triacetate (VIj)

To a stirred solution of 30.3 mg. of 7β-hydroxy estrone in 9 ml. of methanol is added a solution of 60.4 mg. of sodium borohydride in 3 ml. of water. After 3 hours at room temperature the excess sodium borohydride is decomposed with 10% acetic acid and 15 ml. of water is added to the reaction mixture which is then twice extracted with 20 ml. portions of ethyl acetate. The residue from the washed and dried ethyl acetate is crystallized from ethyl acetate yielding 22 mg. of 7β-hydroxy estradiol melting at 238.5–239.5° C. (corr.).

Following the procedure set forth in Example 7, but substituting 7β-hydroxy estradiol obtained in Example 19, for 6β-hydroxy 7α-bromoestradiol diacetate (IVa) yields 7β-hydroxy estradiol triacetate (VIj).

This invention may be variously otherwise embodied within the scope of the appended claims.

What is claimed is:

1. A compound of the formula

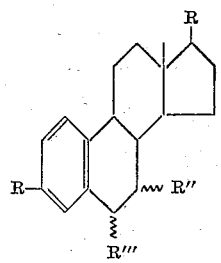

wherein each R is acyloxy; R″ is selected from the group consisting of hydrogen and halogen; and R‴ is selected from the group consisting of hydroxy lower alkoxy and acyloxy; wherein the acyl radical is of a hydrocarbon carboxylic acid of less than twelve carbon atoms.

2. A compound of the formula

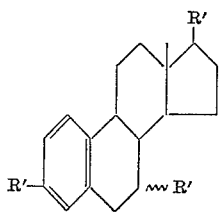

wherein each R' is selected from the group consisting of hydroxy and acyloxy, wherein the acyl radical is of a hydrocarbon carboxylic acid of less than 12 carbon atoms.

3. 7β-hydroxyestradiol, triacetate.

4. 6β-hydroxy-7α-haloestradiol-3,17-diacetate.
5. 6-keto-7α-haloestradiol-3,17-diacetate.
6. 6α-hydroxy-7α-haloestradiol-3,17-diacetate.
7. 7β-hydroxy-estradiol-3,17-diacetate.
8. 7β-hydroxy estradiol.
9. 6α-lower alkoxy-7β-hydroxy estradiol-3,17-diacetate.
10. 6β,7α-dihydroxyestradiol-tetraacetate.
11. 6α,7β-dihydroxyestradiol-tetraacetate.
12. 6β-hydroxy-7α-bromoestradiol, 3,17-diacetate.
13. 6α-hydroxy-7α-bromoestradiol, 3,17-diacetate.
14. 6-lower alkoxy-7-hydroxy estradiol, 3,17-diacetate.

References Cited in the file of this patent
UNITED STATES PATENTS 2,418,603    Schwenk et al. _____ Apr. 8, 1947
2,921,064    Ringold et al. _____ Jan. 12, 1960